United States Patent [19]

Allen

[11] Patent Number: 4,750,053
[45] Date of Patent: Jun. 7, 1988

[54] METHOD AND SYSTEM FOR ENABLING TELEVISION COMMERICAL MONITORING USING A MARKING SIGNAL SUPERIMPOSED OVER AN AUDIO SIGNAL

[75] Inventor: David W. Allen, Media, Pa.
[73] Assignee: Broadcast Advertisers Reports, Inc., Darby, Pa.
[21] Appl. No.: 576,140
[22] Filed: Feb. 2, 1984
[51] Int. Cl.[4] .................. G11B 20/02; H04N 5/44; H04N 5/60
[52] U.S. Cl. .................... 358/335; 358/908; 360/8; 360/14.1; 360/18; 360/31; 360/33.1
[58] Field of Search ............ 360/13, 14.1, 27, 33.1, 360/8, 18, 19.1, 69, 10.1, 31, 72.2, 74.4; 358/139, 335, 908, 165; 369/28

[56] References Cited

U.S. PATENT DOCUMENTS

| | | |
|---|---|---|
| 3,703,774 | 11/1972 | Goshima . |
| 3,881,072 | 4/1975 | Becker ................. 369/28 |
| 4,135,058 | 1/1979 | Pfost et al. . |
| 4,195,317 | 3/1980 | Stratton ............ 360/14.1 X |
| 4,210,940 | 7/1980 | Prysby et al. ........ 360/14.1 X |
| 4,230,990 | 10/1980 | Lert, Jr. et al. . |
| 4,259,689 | 3/1981 | Bonner et al. ........ 358/165 |
| 4,283,735 | 8/1981 | Jagger . |
| 4,288,823 | 9/1981 | Yamamoto et al. . |
| 4,305,101 | 12/1981 | Yarbrough et al. ...... 360/69 |
| 4,314,285 | 2/1982 | Bonner et al. . |
| 4,319,286 | 3/1982 | Hanpachern . |
| 4,333,110 | 6/1982 | Faerber et al. ........ 358/165 |
| 4,338,639 | 7/1982 | Fujibayashi ........... 369/28 X |
| 4,343,039 | 8/1982 | Smith, Jr. et al. ...... 369/28 |
| 4,390,904 | 6/1983 | Johnston et al. ....... 358/908 X |
| 4,420,769 | 12/1983 | Novak ................. 358/335 |
| 4,439,785 | 3/1984 | Leonard .............. 358/335 X |
| 4,445,151 | 4/1984 | Kinoshita et al. ...... 360/27 |
| 4,496,997 | 1/1985 | Ohtsuki .............. 360/13 |
| 4,533,949 | 8/1985 | Fujimura et al. ....... 360/33.1 X |

FOREIGN PATENT DOCUMENTS

WO81/00945 4/1981 PCT Int'l Appl. .
83/00971 3/1983 PCT Int'l Appl. ........ 358/908

OTHER PUBLICATIONS

"What's New in ... Commercial Killers, Tape Applications and Transistorized Receivers", *Radio-Electronics*, pp. 50-52, Sol Heller, Aug. 1955.
"Electronics Helps Advertisers Keep Track of Their TV Ads", Electronic Design 11, May 27, 1971, pp. 26-28, by Jim McDermott.

*Primary Examiner*—Raymond F. Cardillo
*Assistant Examiner*—W. R. Young
*Attorney, Agent, or Firm*—Dann, Dorfman, Herrell and Skillman

[57] ABSTRACT

A system and method for detecting and marking television commercials is provided. A first comparator is utilized for comparing the television video signal to an adjustable reference voltage and for generating a triggering signal when a video signal is not present at the comparator input. A second comparator compares the television audio signal to a second adjustable reference voltage to provide a triggering signal when an audio signal is not present at the comparator input. The outputs from the two comparators are supplied to a one-shot timer mechanism which is adapted to generate an output signal of a predetermined time period only upon the simultaneous absence of an audio and video signal, thus signifying a fade break in the television broadcast signal. The timed output signal from the timer mechanism is connected to a low frequency oscillator which generates a low frequency output signal upon being actuated by the output from the timer mechanism.

17 Claims, 2 Drawing Sheets

METHOD AND SYSTEM FOR ENABLING TELEVISION COMMERICAL MONITORING USING A MARKING SIGNAL SUPERIMPOSED OVER AN AUDIO SIGNAL

FIELD OF THE INVENTION

The present invention relates to a method and system for enabling television commercial monitoring. More specifically, the invention relates to a method and system for detecting television commercials and for marking the location of the commercials on a recording medium and, more particularly, to a method and system for detecting and indexing television commercials by the use of marking signal recorded with the commercial onto a recording medium to mark the location of the commercial to enable subsequent commercial monitoring.

BACKGROUND OF THE INVENTION

The accurate monitoring of television advertising is extremely important to the marketing efforts employed by a wide variety of different industries. Because of the significant advertising revenues involved and the competitive nature of television advertising, there is a great demand for information relating to television advertising which can be obtained through the accurate monitoring of the television broadcast material.

It is extremely valuable, particularly in highly competitive markets, for a company to ascertain the nature and extent of a competitor's television advertising. Among other information, marketing trends, advertising expenditures, marketing strategy, shares in the market place, and sales campaigns can all be ascertained through the monitoring of television advertising. The information acquired through television monitoring can provide competitors with relevant marketing information concerning the frequency and nature of the competitor's advertising. In addition, new product information becomes available almost as soon as the product is test marketed. In addition to assisting competitors in evaluating the market place, relevant information can also provide sales leads to individual stations, networks and newspapers. Of course, the reliability of the information is in large part dependent upon the accuracy in which the television advertising is monitored.

Many of the monitoring techniques which have been employed have typically relied upon prior knowledge of the broadcasting schedules of individual commercials or upon a particular coding of some part of the audio or video portion of the film or tape on which the program information had been previously recorded. The reluctance of the advertisers to voluntarily divulge advertising strategies, either prematurely or otherwise, has resulted in monitoring techniques which in large part have been unsuccessful.

Reliable and complete information has been available only by individual monitoring of live television broadcasts or the individual monitoring of tape recordings of the television broadcasts. Although reliable, this type of monitoring is extremely inefficient since the individuals monitoring the television commercials must spend a significant amount of time viewing actual program material rather than just the television commercials.

SUMMARY OF THE INVENTION

The present invention provides a system for enabling television commercial monitoring from audio and video signals of any television broadcast signal received by a selected signal receiver. First triggering means connected to the signal receiver is responsive to the television broadcast signal for generating a first triggering signal when a video signal from the television broadcast signal reaches a selected video signal threshold level. For this purpose, comparator means is provided having one of its inputs connected with the television receiver and having its other input connected with an adjustable threshold potential level. The first input of the comparator receives a video signal from the television broadcast signal. When the magnitude of the video signal passes the selected threshold level, the comparator means outputs a first triggering signal. In a preferred embodiment, the triggering signal is a digital low signal or, in effect, a zero potential output.

A second triggering means connected with the signal receiver is responsive to the television broadcast signal for generating a second triggering signal when an audio signal from the television broadcast signal reaches a selected audio signal threshold level. For this purpose, the second triggering means comprises second comparator means having a first input connected with the signal receiver for receiving a selected audio signal and having a second input connected with an adjustable potential level which provides a selected threshold level. When magnitude of the audio signal supplied to the input of the comparator means passes the selected threshold potential, the comparator means outputs a second triggering signal. In a preferred embodiment, the selected triggering signal is also a digital low signal or a zero potential output. The system comprises audible signal generator means responsive to the first and second triggering signals for generating an audible marking signal when the magnitude of the combined first and second triggering signals reach a selected activated threshold level which corresponds to a predetermined television commercial signal, such as a fade from the television broadcast signal. In a preferred embodiment, the audible signal generator means generates an audible marking signal when both the first and second triggering signals are digital low signals. To produce the audible marking signal, the audible signal generator means comprises a signal generator for producing a selected audible marking signal and timed actuating means connected with the signal generator and responsive to the first and second triggering signals for actuating the signal generator to produce the audible marking signal for a predetermined time period upon detection of a television commercial or a group of television commercials at a commercial fade.

A method for enabling television commercial monitoring from audio and video signals of a television broadcast signal is also provided. The method comprises the step of receiving the television broadcast signal. The broadcast signal may either be a direct signal or a previously recorded one. A first triggering signal is generated in response to the television broadcast signal when the magnitude of a video signal from the television broadcast signal reaches a selected video signal threshold level. A second triggering signal is generated in response to the television broadcast signal when the magnitude of an audio signal from the television broadcast signal reaches a predetermined audio signal threshold level. An audible marking signal is generated in response to the first and second triggering signals when the magnitude of the combined first and second triggering signals reach a selected activating threshold level when a selected television commercial signal, such as a commercial fade break, appears in the television broadcast signal.

BRIEF DESCRIPTION OF THE DRAWINGS

The foregoing summary, as well as the following detailed description of the preferred embodiment of the present invention, will be better understood when read in conjunction with the appended drawings in which.

DESCRIPTION OF THE PREFERRED EMBODIMENT

Figure 1:
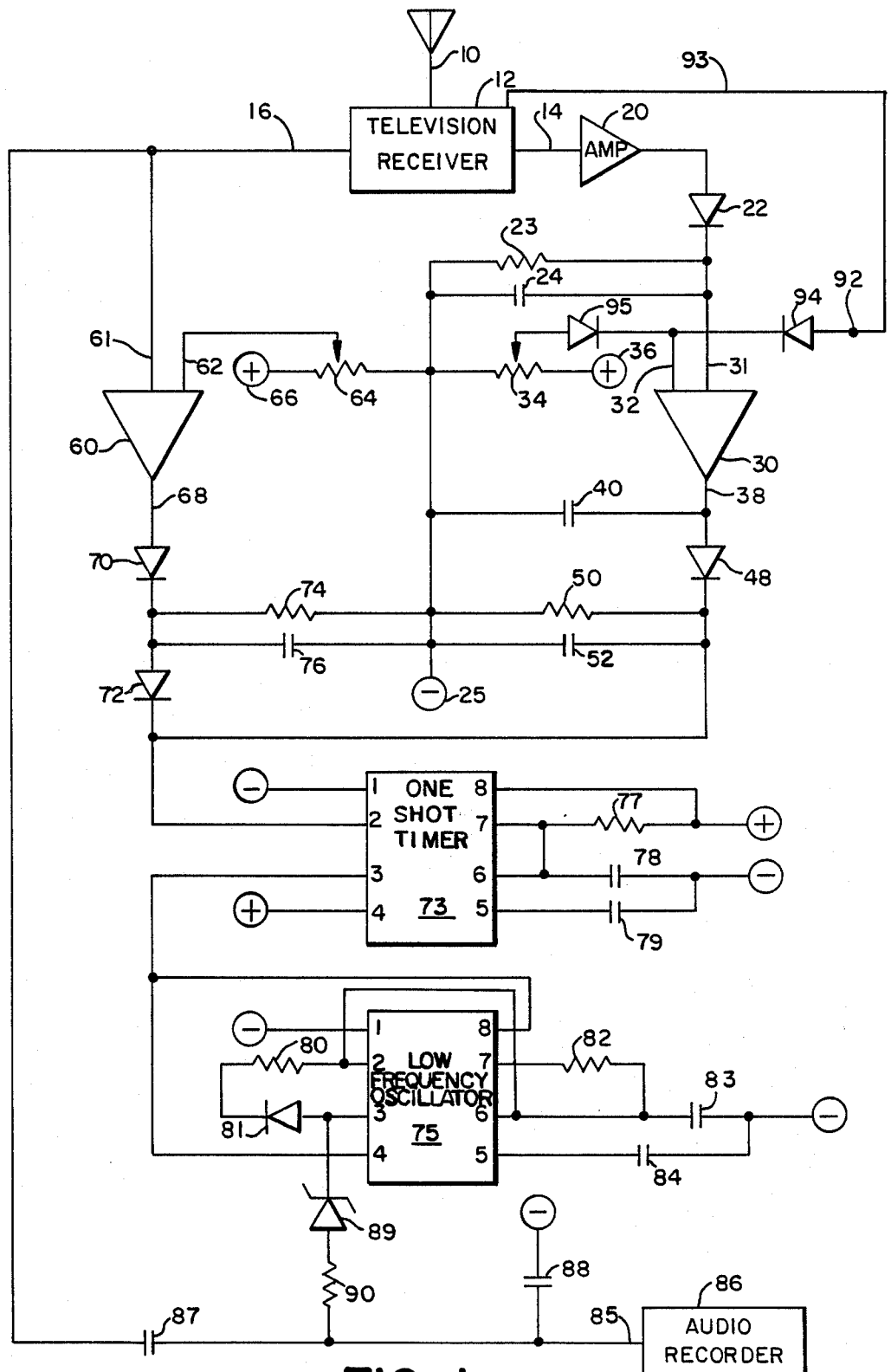
FIG. 1 is a schematic view of the circuitry for detecting a television commercial and for producing an audible marking signal upon the detection of the commercial.

Referring to the drawings and initially to FIG. 1, a circuit for detecting television commercials from audio and video signals of a television broadcast signal is illustrated. The television broadcast signal, which may be either a direct transmission or a previously recorded signal, is received at the input 10 of a selected signal receiver 12, such as a television receiver, A video signal from the television broadcast signal is supplied from television receiver 12 to video output line 14. Likewise an audio signal from the television broadcast signal is supplied from the television receiver to audio output line 16.

The video signal from the television receiver is amplified by amplifier 20 on audio output line 14 and compressed through a video transform circuit consisting of diode 22 connected across a parallel arrangement of resistor 23 and capacitor 24 to ground 25. The compression of the video signal eliminates nonessential portions of the output video signal and greatly improves noise immunity.

The compressed video signal is supplied to comparator 30 at the first input terminal 31. In order to provide a reference, the other input terminal 32 of comparator 32 is connected to an adjustable threshold potential provided by variable resistor 34, such as a potentiometer, connected between positive potential source 36 and ground 25. The comparator 32 is arranged so that whenever the magnitude of the compressed video signal supplied at the first input terminal 31 exceeds the selected reference video signal threshold potential provided at terminal 32, a positive d.c component of the video signal appears at output terminal 38 of the comparator 30. When the compressed video signal reaches or falls down to or below the predetermined threshold potential, the output of the comparator falls to a digital low or a zero potential output signal.

The first comparator functions as a first triggering means which is responsive to the television broadcast signal for generating a first triggering signal, such as the zero potential output signal, when the compressed video signal from the television broadcast signal reaches a predetermined video signal threshold level. Resistor 34 is a variable resistor so that the threshold potential may be adjusted to a selected level. The comparator is connected so that a zero output voltage appearing at output terminal 38 serves as the selected triggering signal.

Capacitor 40 is connected between the output terminal 38 of the comparator 30 and ground 25 and functions to by-pass remaining video components. Output terminal 38 of comparator 30 is also connected to the input of diode 48. The output of diode 48 is connected through a parallel arrangement of resistor 50 and capacitor 52 to ground 25.

Audio output terminal 16 is connected to comparator 60 at the first input terminal 61. In order to provide a reference, input terminal 62 of comparator 60 is connected to an adjustable threshold potential provided by a variable resistor 64, such as a potentiometer, connected between positive potential source 66 and ground 25. Whenever the magnitude of the audio signal from the television receiver 12 exceeds the reference threshold potential as selected by the adjustable variable resistor 64, a positive d.c. component of the audio signal appears at output terminal 68 of comparator 60. If the audio signal supplied at input 61 reaches or falls down to or below the threshold potential provided at input 62, a digital low or a zero potential output signal is provided at output terminal 68 of comparator 60. In this manner, the comparator functions as a second triggering means responsive to the television broadcast signal for generating a triggering signal when an audio signal from the television broadcast signal reaches a selected audio signal threshold potential level. Resistor 64 is a variable resistor so that the audio threshold level may be adjusted to a selected level. As embodied, the selected triggering signal is a digital low or a zero potential output signal provided at output terminal 68 of comparator 60.

Output terminal 68 is connected to a series arrangement of diodes 70 and 72. A parallel arrangement of resistor 74 and capacitor 76 is connected between the two diodes 70 and 72 to ground 25. The output of diode 48 from the video circuitry is, in turn, connected with the output of diode 72 from the audio circuitry so that the first and second triggering signals are combined together by the circuitry and supplied to a "555" integrated circuit chip 73 which is configured and biased to function as a one shot timer mechanism. Diodes 72 and 48 provide isolation from the signals which appear at the output of the other diode. The outputs of diodes 48 and 72 are connected to input pin 2 of the "555" integrated circuit chip 73 so that pin 2 is connected with the output terminals of comparators 30 and 60 and receives the combined triggering signals generated by the respective comparators. Pin 1 of the integrated circuit is connected to ground. Pin 3 functions as an output terminal. Pin 4 and pin 8 are connected to a source of positive potential. Pin 6 and pin 7 are shunted together and connected to a positive potential source through timing resistor 77. Timing capacitor 78 is connected from pins 6 and 7 to ground. Pin 5 of the integrated circuit chip is connected to ground through capacitor 79.

As configured, integrated circuit chip 73 functions as a one-shot timer mechanism. The output signals from comparators 30 and 60 are simultaneously supplied to the input of the timer mechanism at pin 2. When the combined output signals from comparators 30 and 60 reach a predetermined activating level, which is at zero potential in the present embodiment the timer mechanism triggers and generates an output signal of a predetermined time period at output pin 3. Since the timer mechanism functions as a one-shot, an output will be generated continuously for the predetermined time period even if the activating triggering signal is instantaneously removed from the input of the timer mechanism.

The output at pin 3 of the timer mechanism 73 is supplied to a second "555" integrated circuit chip 75 at pins 4 and 8. Chip 75 is configured and biased to function as a low frequency oscillator. Pin 1 is connected to ground. Pins 2 and 3 are connected to each other through resistor 80 and diode 81 and pin 3 functions as the output terminal. Pins 2 and 6 are shunted together and pin 7 is connected to pin 6 through timing resistor 82. Timing capacitor 83 is connected between pin 6 and ground. This configuration causes the "ON" time of chip 75 to be much shorter than the "OFF" time. Pin 5 is connected to ground through capacitor 84. As previously stated, pins 4 and 8 serve as input terminals for receiving the output signal generated by timer mechanism 73. Whenever the timer mechanism 73 is triggered by the combined output triggering signals of comparators 30 and 60, the timer mechanism generates an actuating output signal for a predetermined time period. The activating output signal from the timer mechanism 73 is supplied to the oscillator 75 thereby actuating the oscillator to generate an audible marking signal of selected frequency and amplitude during the predetermined time period in which the actuating output signal is produced by the timer so that the timer mechanism serves as a timed actuator for the oscillator mechanism.

The audio output terminal 16 of the television receiver 12 is connected to the input terminal 85 of an audio recorder 86 through capacitor 87. The output of the low frequency oscillator 75 at pin 3 is also connected to input terminal 85 of the audio recorder 86 through Zener diode 89 and resistor 90. The low frequency oscillator 75 functions to produce a pulsed output at a predetermined rate, for example four pulses per second, for the predetermined time interval, such as five seconds, that a timer mechanism 73 produces its actuating output signal. The pulsed output from the lwo frequency oscillator is supplied through Zener diode 89 and resistor 90 and combined with the regular audio signal from television receiver 12 and supplied to audio recorder 86 where both signals are superimposed and simultaneously recorded on a selected recording medium such as magnetic recording tape.

The presence of a television commercial or a group of television commercials during program broadcasting is reflected by a commercial fade break in which there is a simultaneous absence of both audio and video signals from the television broadcast signal. The above-described circuitry functions to detect the fade break and produce an audible marking signal. The audible marking signal can be superimposed and recorded with at least the audio signal of the television broadcast signal in such a manner that the audible marking signal is readily discernible from the audio signal and the presence of a commercial is "marked" on the recording medium.

During a program broadcast, either through an original broadcast or through a prerecorded broadcast supplied by an audio/video recorder, either or both an audio or a video signal will generally be present throughout the program broadcast until a fade break signalling a commercial or a group of commercials is encountered. If a video signal is present, some component of the video signal will be supplied to the input terminal 31 of comparator 30 and compared to the selected threshold level provided at terminal 32. The threshold is appropriately set so that during program broadcast the video signal at input terminal 31 exceeds the threshold at terminal 32 and a d.c. component of the video signal appears at the output terminal 38 of comparator 30. Capacitor 40 bypasses remaining video components and diode 48 provides isolation. A positive d.c. voltage representing the exiting video signal is supplied to the input of the timer mechanism 73 which prevents the timer mechanism from triggering. As long as a d.c. voltage is present at the input of the timer mechanism, the timer mechanism will not produce an output signal. Likewise, during program broadcast, the audio signal supplied at input 61 of comparator 60 exceeds the threshold potential at input 62 and a d.c. output voltage appears at output 68. Isolation is provided by diode 70 and the remaining audio component is bypassed by capacitor 76. The d.c. output voltage from output 68 is supplied to the input of the timer mechanism 73 and prevents the timer mechanism from triggering. Therefore, if either an audio or video signal is present in the broadcast signal, a d.c. voltage will be supplied to the timer mechanism so that it is not triggered into producing an output signal.

During a commercial fade, when both video and audio signals are absent, the threshold level at input 32 of comparator 30 will exceed the video input signal at 31 causing comparator 30 to produce a zero potential output triggering signal at output terminal 38. Likewise, the threshold potential 62 of comparator 60 will exceed the input audio signal at input terminal 61 and a zero potential output triggering signal will also appear at output terminal 68 of comparator 60. When zero potential output signals are present at both of the output terminals of comparators 30 and 60, the combined output signals from comparators 30 and 60 reach the zero potential activating threshold of the timer mechanism 73 causing the timer mechanism 73 to trigger and generate an actuating output signal for a predetermined time period, such as five seconds. The output signal from the timer mechanism 73 will actuate the low frequency oscillator 75 causing the low frequency oscillator to produce a pulsed output signal. The pulsed output signal serves as an audible marking signal and is passed through Zener diode 89 and resistor 90 to the input terminal 85 of audio recorder 86. The audible marking signal is superimposed over the normal audio signal which is supplied from the television receiver 12 through amplitude and frequency limiting capacitors 87 and 88 to the input terminal 85 of the audio recorder 86. As a result, when a commercial fade appears, an audible marking signal is generated in order to "mark" or index the commercial. As soon as the commercial fade terminates, either the audio or video signals or both will once again appear at respective inputs of comparators 30 and 60 causing a d.c. voltage to appear at the input of the timer mechanism preventing it from retriggering. Since the timer mechanism is configured and biased to function as a one-shot, the timer mechanism 73 will produce an output for a predetermined interval when initially triggered even though a shut down voltage once again appears at the input terminal of the timer mechanism prior to the termination of the predetermined time interval.

For effective marking, the amplitude of the marking signal must be carefully controlled so that a person listening to the recording audio signal can accurately detect the existence of the superimposed marking signal. If the amplitude of the marking signal is too low, the listener wil not be able to discern the audible marking signal from the program material. If the amplitude of the marking signal is too high, the circuits will overload causing an audio cut-off ranging from fractions of a saecond following each pulse to total obliteration for the predetermined time interval. In addition, if the amplitude of the marking signal is too large, the pulse will have a tendency to bleed across multiple tracks used in recording causing many false or ghost marks. A carefully controlled balance is achieved by matching the particular television receiver to the audio recorder through the use of the above-described coupling circuit which controls the relative amplitude of the mark with respect to the television audio signal but without affecting the sharp peak aspect of the mark. By utilizing a low frequency oscillator to produce a carefully controlled pulse train of four steep, short pulses per second over a five second time interval, an audibly discernible marking signal is obtained. When recorded and played back at normal speed, the marking signal will have the sound of a fast, soft heart beat which will not interfere with or delete the recorded television audio signal and particularly the recorded audio signal of the commercial. However, when the recorded audio marking signal and audio signal are played back in a fast forward mode, the rapid playback of the pulses of the marking signal create a distinctive chirp which is easily discernible and distinguishable from the sounds of the recorded audio signal. Therefore, the existence and exact location of a commercial on the recording medium will be easily detected.

Depending upon the televison receiver being utilized, it is possible that vertical interval signals from the television broadcast signal may be supplied as an output to video signal output terminal 14. To eliminate any interference from the vertical interval signals, a vertical blanking pulse from receiver 12 is supplied via line 93 to at an input terminal 92 connected with the second input terminal 32 of comparator 30. Opposing diodes 94 and 95 function to effectively isolate the adjustable threshold potential level supplied through variable resistor 34 from the vertical blanking pulse supplied at input 92. The vertical blanking pulse supplied at input 92 causes the threshold level at terminal 32 of the comparator 30 to exceed the video component of the vertical interval signals supplied to terminal 31 of the comparator 30, which thereby causes the comparator to produce a zero output triggering signal for a very short time period. The zero output triggering signal which is produced for the short time period might normally trigger timer mechanism 73 but the zero potential output signal is bridged by the potential stored on capacitor 52 so that a voltage potential of a magnitude sufficient to inhibit the triggering of the timer mechanism is supplied by capacitor 52 to the timer mechanism 73 during the general duration of the vertical blanking signal and the vertical interval signal so as to prevent false triggering of the timer mechanism 73. The potential stored on capacitor 52 thereby prevents the combined outputs from comparators 30 and 60 from reaching the activating threshold of the timer mechanism. As such, the system effectively suppresses the vertical interval signals from the video signal to prevent the vertical interval signals from interfering with the triggering of the low frequency oscillator 75.

Figure 2:
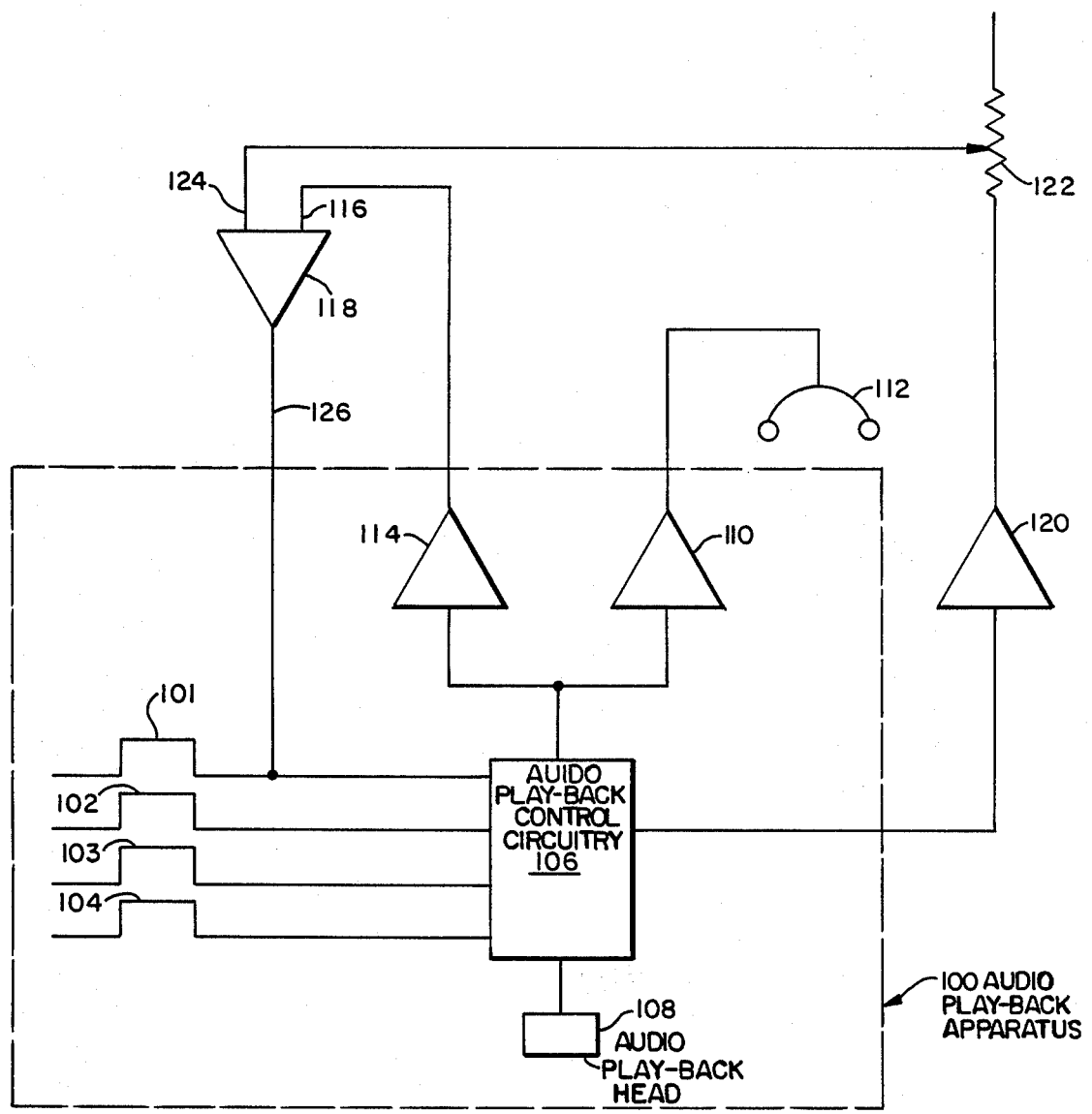
FIG. 2 is a schematic view of the circuitry for detecting the audible marking signal when simultaneously recorded with at least the audio signal of the television broadcast signal on a selected recording medium.

Referring to FIG. 2, a circuit for detecting the recorded audio marking signal superimposed over the audio signal is provided. The detection of the audible marking signal can be done manually by a human listener manually stopping the tape from playing once the audible marking signal is detected. Alternatively, detection can be done automatically through play-back detection circuitry.

To review the recorded material, a selected play-back apparatus generally designated 100 is provided having various modes of operation. The play-back apparatus illustrated in FIG. 2, includes a stop mode 101, a play mode 102, a fast forward search mode 103, and a reverse mode 104 controlled by manually depressible buttons which are connected with the control circuitry 106 of the play-back apparatus. When the apparatus is used to play back recorded information on a selected recording medium, such as audio recording tape, in either the play mode or the fast forward search mode, the audio play-back head 108 supplies the recorded audio signals through control circuitry 106 to amplifier 110 and then to head phones 112. When manually searching the commercial information, the listener will play back the recorded information in the fast forward play-back mode 103 so that the recorded audio marking signal will be produced as a loud chirp when a commercial fade appears on the tape. The listener will hear the loud chirp through earphones 112 and will depress the stop mode switch 101 to stop the play back of the tape. Inertia will often transport the tape past the desired stopping point requiring the listener to reverse the tape by depressing the reverse mode switch 104. The listener must then depress the normal play-back mode switch 102 to review the contents of the taped commercial for the purpose of monitoring the requisite information from the television commercial. The listener can then proceed to the next marking signal.

Detection of the marking signal may also be accomplished automatically using the fast forward search mode of operation. The audio recording head 108 supplies the recorded audio signal through control circuitry 106 to internal amplifier 114 which amplifies the signal and supplies it to the first input terminal 16 of comparator 118. Amplifier 120 connected with control circuitry 106 supplies a stopping threshold signal through adjustable resistor 122 to the second input terminal 124 of comparator 118. If the play-back apparatus is operating in the normal play-back mode 102, the control circuit 106 will supply sufficient threshold voltage through amplifier 120 to the input terminal 124 of comparator 118 so that neither the recorded audio signal nor the recorded audible marking signal will cause the comparator to trigger and produce a stopping signal at output terminal 126. As a result, there is no interruption of the normal play-back mode 102 by the audible marking signal and the normal play-back mode is under the exclusive manual control of the listener. When the fast forward search mode 103 is utilized, the output from amplifier 120 provides the stopping threshold of comparator 118 at a level which is lower than that of the recorded audible marking signal but greater than that of the normal recorded audio signal. As a result comparator 118 will not trigger until an audible marking signal appears on the recording medium during the fast forward play-back. The appearance of the audible marking signal causes the recorded, superimposed marking and audio signals to reach and exceed the stopping threshold. When the superimposed marking and audio signals reach the stopping threshold, an audible marking signal is detected and comparator 118 generates a stopping signal at output terminal 126. The stopping signal is supplied to the stop mode circuitry of the play-back apparatus for automatically stopping the operation of the play-back apparatus. The stop mode 101 of the play-back apparatus will only be triggered when the play-back apparatus is operating in the fast forward search 103 and an audible marking signal is detected. Once the play-back apparatus is automatically stopped by the stopping signal generated by comparator 118, tape inertia will once again carry the tape some distance past the desired stopping point. The listener will once again have to reverse the tape using reverse mode 104 before initiating the normal play-back mode 102 to enable the listener to monitor the requisite information. Once the required information from the commercial is monitored, the listener will once again operate the play-back apparatus in the fast forward search mode until another audible marking signal is encountered automatically stopping the apparatus. By using a fast forward search mode to detect the audible marking signal, either manually or automatically, the time wasted reviewing irrelevant program material is greatly reduced.

While a certain preferred embodiment of the present invention has been illustrated and described, it is to be understood that certain variations or modifications may be made by a person skilled in the art within the scope of the following claims.

What is claimed is:

1. A system for enabling television commercial monitoring from audio and video signals of a television broadcast signal received by a selected signal receiver comprising:
   (a) first triggering means connected with the signal receiver and responsive to the television broadcast signal for generating a first output triggering signal when a video signal from the television broadcast signal reaches a selected video signal threshold level;
   (b) second triggering means connected with the signal receiver and responsive to the television broadcast signal for generating a second output triggering signal when an audio signal from the television broadcast signal reaches a predetermined audio signal threshold level;
   (c) circuit means connected with the first and second triggering means for combining the first and second triggering signals; and
   (d) signal generator means responsive to the first and second triggering signals for generating a marking signal when the combined first and second triggering signals reach a selected activating threshold level when the broadcast signal fades at a television commercial, the signal generator means including actuator means having an input for receiving the combined first and second triggering signals to detect when the combined first and second triggering signals reach the selected activating threshold level and having an output for providing an actuating signal when the activating threshold is reached, the signal generator means being responsive to the actuating signal for generating the marking signal with a selected format to enable the marking signal and the audio signal of the television broadcast signal to be simultaneously recorded on a selected recording medium so that the marking signal is superimposed over at least a portion of the recorded audio signal without interfering with the recorded audio signal to mark the location of the television commercial on the recording medium without deleting the television commercial from the recording medium so as to enable subsequent location and monitoring of the television commercial recorded on the recording medium.

2. The system as recited in claim 1 wherein said signal generator means comprises means for producing the marking signal for a predetermined time period.

3. The system as recited in claim 1 wherein said first triggering means comprises reference means providing the video signal threshold level, and video signal comparator means for comparing the video signal to the video signal threshold level and for producing said first triggering signal when said video signal reaches said video signal threshold level.

4. The system as recited in claim 3 wherein said comparator means produces said first triggering signal when said video signal falls down to said video signal threshold level.

5. The system as recited in claim 1 wherein said second triggering means comprises reference means providing the audio signal threshold level, and audio signal comparator means for comparing the audio signal to the audio signal threshold level and for producing said second triggering signal when said audio signal reaches said audio signal threshold level.

6. The system as recited in claim 5 wherein said comparator means produces said second triggering signal when said audio signal falls down to said audio signal threshold level.

7. The system as recited in claim 1 wherein said video signal includes vertical interval signals and wherein said system comprises signal suppression means for suppressing the vertical interval signals from the video signals to prevent the vertical interval signals from falsely triggering the signal generator means.

8. The system in accordance with claim 7 wherein the signal suppression means includes means cooperating with the first triggering means to prevent the combined first and second triggering signals from reaching the activating threshold level during the vertical interval signals.

9. The system as recited in claim 1 comprising video signal transform means connected between the first triggering means and the signal receiver for transforming the video signal in a predetermined manner to produce a transformed video signal, and wherein said first triggering means is responsive to the transformed video signal for producing the first triggering signal when the transformed video signal reaches the predetermined video signal threshold level.

10. The system as recited in claim 9 wherein said first triggering means comprises reference means for providing the video signal threshold level, and video signal comparator means for comparing the transformed video signal to the video signal threshold level to produce said selected first triggering signal when said transformed video signal reaches said video signal threshold level.

11. The system as recited in claim 10 wherein said comparator means produces said first triggering signal when said transformed video signal falls down to said video signal threshold level.

12. The system as recited in claim 1 wherein said signal generator means generates the marking signal as an audible marking signal at a selected audible frequency and magnitude so that the audible marking signal is audibly discernible from the audio signal recorded on the selected recording medium during a selected playback mode of operation of a selected playback apparatus.

13. The system as recited in claim 12 wherein said audible marking signal is audibly discernible during an audible fast forward playback mode.

14. The system as recited in claim 12 comprising comparator means connected with the selected playback apparatus for comparing the superimposed audible marking signal and the audio signal recorded on the selected recording medium to a stopping threshold level and for producing a selected stopping signal when said audible marking signal reaches the selected stopping threshold level, and wherein said recording means comprises means responsive to the stopping signal for switching the selected playback apparatus into a stop mode of operation.

15. The system in accordance with claim 1 wherein the signal generator means generates the marking signal as an audible marking signal with a selected format to audibly mark the location of the television commercial on the recording medium without deleting any portion of the television commercial from the recording medium.

16. A system for enabling television commercial monitoring from audio and video signals of a television broadcast signal received by a selected signal receiver comprising:
  (a) first triggering means connected with the signal receiver and responsive to the television broadcast signal for generating a first output triggering signal when a video signal from the television broadcast signal reaches a selected video signal threshold level;
  (b) second triggering means connected with the signal receiver and responsive to the television broadcast signal for generating a second output triggering signal when an audio signal from the television broadcast signal reaches a predetermined audio signal threshold level;
  (c) circuit means connected with the first and second triggering means for combining the first and second triggering signals; and
  (d) signal generator means responsive to the first and second triggering signals for generating a marking signal when the combined first and second triggering signals reach a selected activating threshold level when the broadcast signal fades at a television commercial, the signal generator means including a signal generator for producing the marking signal and actuator means having an input for receiving the combined first and second triggering signals to detect when the combined first and second triggering signals reach the selected activating threshold level and having an output for providing an actuating signal to the signal generator when the activating threshold is reached, said actuator means including timed actuating means responsive to the combined first and second triggering signals for producing the actuating signal for a predetermined time period to actuate the signal generator to produce the marking signal for said predetermined time period and with a selected format to enable the marking signal to be recorded with at least one of the audio and video signals of the television broadcast signal on a selected recording medium to mark the location of the television commercial on the recording medium without deleting the television commercial from the recording medium so as to enable subsequent location and monitoring of the television commercial recorded on the recording medium.

17. The system as recited in claim 16 wherein said signal generator comprises a low frequency oscillator for producing the marking signal as an audible marking signal at a predetermined low audible frequency and magnitude.

* * * * *

UNITED STATES PATENT AND TRADEMARK OFFICE
CERTIFICATE OF CORRECTION

PATENT NO. : 4,750,053
DATED : June 7, 1988
INVENTOR(S) : DAVID W. ALLEN

It is certified that error appears in the above-identified patent and that said Letters Patent is hereby corrected as shown below:

Column 3, line 28, after "receiver" and before "A", delete "," (comma) and insert --.-- (period);

Column 3, line 52, "d.c" should be --d.c.--;

Column 6, line 6, "exiting" should be --existing--;
Column 6, line 65, "recording" should be --recorded--;
Column 6, line 68, "wil" should be --will-;
Column 7, line 4, "saecond" should be --second--;
Column 8, line 19, after "searching" delete "the" and insert --for--;
Column 8, line 39, "16" should be --116--.

Signed and Sealed this

Fourteenth Day of February, 1989

*Attest:*

DONALD J. QUIGG

*Attesting Officer*     *Commissioner of Patents and Trademarks*